(12) United States Patent
Schranz

(10) Patent No.: US 8,668,261 B2
(45) Date of Patent: Mar. 11, 2014

(54) ADJUSTABLE SADDLE SUPPORT

(76) Inventor: Paul Steven Schranz, Bowen Island (CA)

( * ) Notice: Subject to any disclaimer, the term of this patent is extended or adjusted under 35 U.S.C. 154(b) by 601 days.

(21) Appl. No.: 12/867,884

(22) PCT Filed: Feb. 25, 2009

(86) PCT No.: PCT/CA2009/000196
§ 371 (c)(1),
(2), (4) Date: Aug. 16, 2010

(87) PCT Pub. No.: WO2009/105864
PCT Pub. Date: Sep. 3, 2009

(65) Prior Publication Data
US 2010/0327641 A1 Dec. 30, 2010

Related U.S. Application Data

(60) Provisional application No. 61/031,362, filed on Feb. 26, 2008, provisional application No. 61/081,394, filed on Jul. 17, 2008.

(51) Int. Cl.
B62J 1/00 (2006.01)

(52) U.S. Cl.
USPC .................. 297/215.14; 297/195.1

(58) Field of Classification Search
USPC ............... 297/195.1, 215.14, 195.11, 337
See application file for complete search history.

(56) References Cited

U.S. PATENT DOCUMENTS 5,007,675 A * 4/1991 Musto et al. ......... 297/215.14 X
2008/0303320 A1 * 12/2008 Schranz .................. 297/215.14

FOREIGN PATENT DOCUMENTS

DE 4232655 A1 * 3/1994

* cited by examiner

Primary Examiner — Anthony D Barfield

(57) ABSTRACT

There is provided an adjustable saddle support that adjustably connects a conventional bicycle saddle with a conventional bicycle seat post. The conventional bicycle seat post has a conventional first saddle clamp mechanism. The adjustable saddle support comprises an adjustment mechanism that has a second saddle clamp mechanism and a support member which supports the adjustment mechanism. The adjustment mechanism adjustably engages the support member. There is also a pair of rails which have parallel spaced apart sections. The pair of rails is connected with the support member.

20 Claims, 11 Drawing Sheets

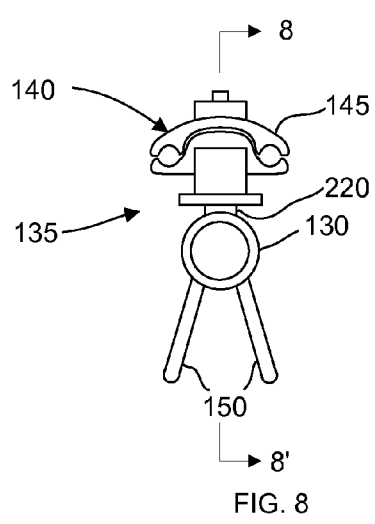
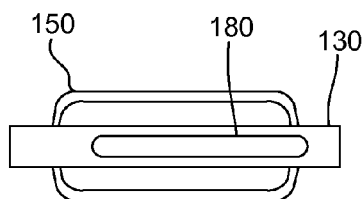
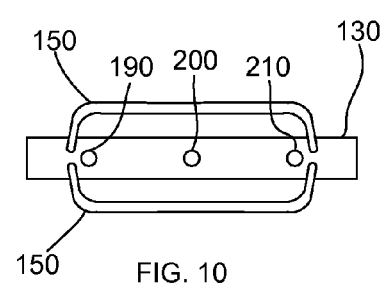
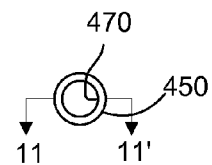
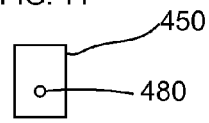
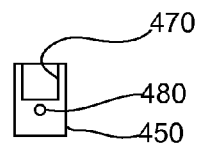
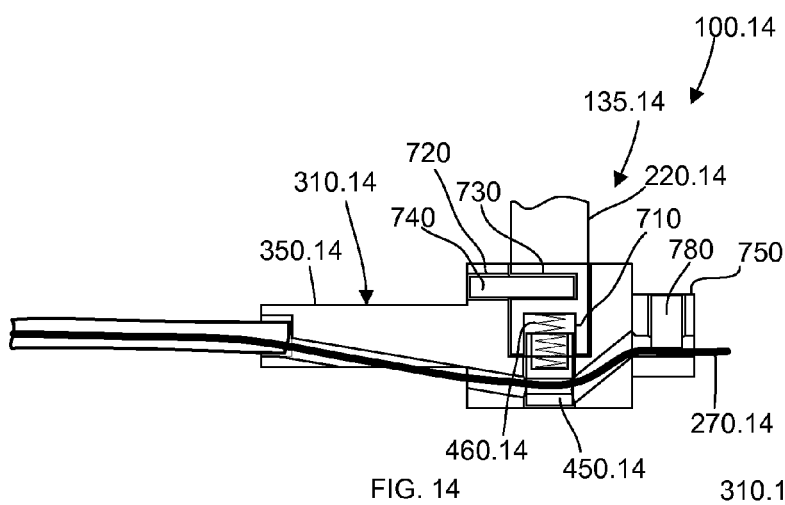
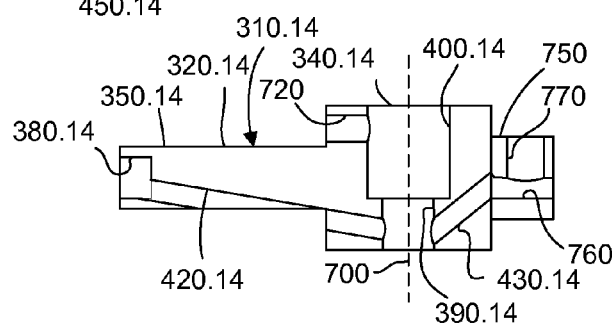

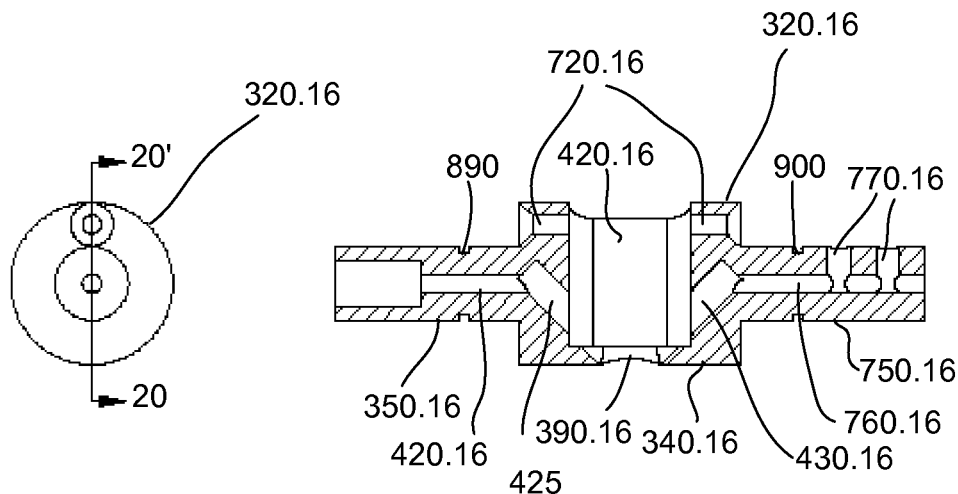
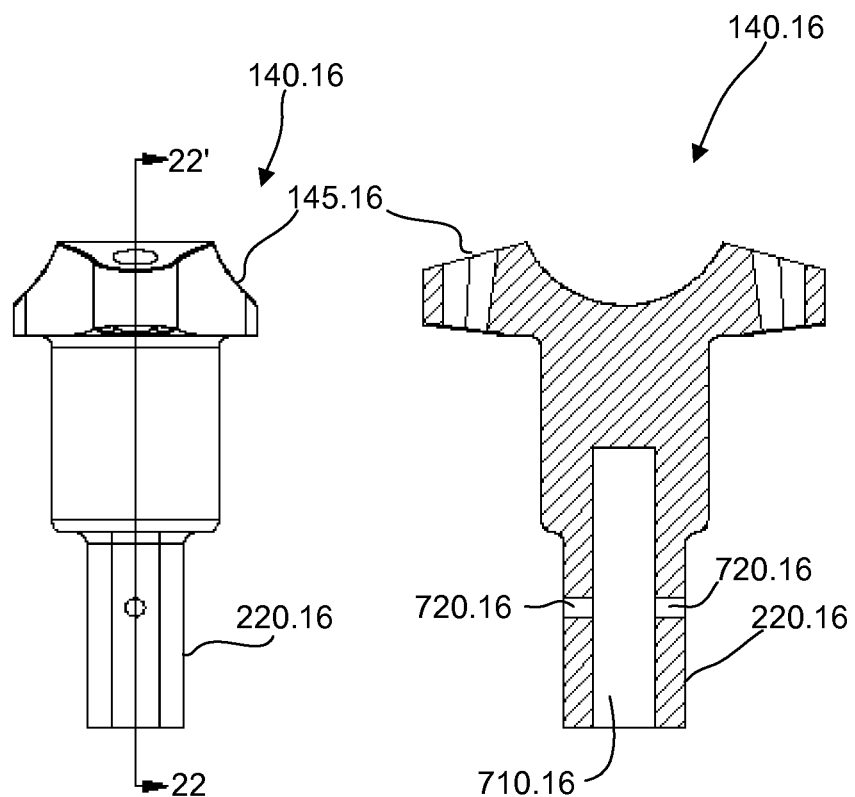
FIG. 18  FIG. 19  FIG. 20  FIG. 21

ADJUSTABLE SADDLE SUPPORT

RELATED APPLICATION

This application is the National Stage under 35 U.S.C. 371 of the PCT International Patent Application No. PCT/CA2009/000196, filed on Feb. 25, 2009, which further claims the priority benefit of the U.S. Provisional Patent Application No. 61/031,362 filed on Feb. 26, 2008, and the priority benefit of U.S. Provisional Patent Application No. 61/081,394 filed on Jul. 17, 2008.

BACKGROUND OF THE INVENTION

1. Field of the Invention

This invention relates generally to saddle supports for bicycles. More particularly, it relates to an adjustable saddle support for bicycles.

2. Description of the Related Art

Conventionally, bicycles typically have an adjustable seat post for adjusting the bicycle seat to the rider's desired position. Generally, the seat post is received within the upright seat post receiving shaft of a bicycle, and is slid to the correct position and then clamped in place. It is important to achieve the correct position for the bicycle seat so that pedaling efficiency is maximized, and so that stresses on the knees and over extension of the hamstrings are minimized.

More advanced adjustable seat posts allow for a quick adjustment of the bicycle seat along the upright seat post axis by employing a locking spring mechanism that biases the bicycle seat in an upward direction, as disclosed in U.S. Pat. No. 6,478,278, issued Nov. 12, 2002 to Allen Gary Duncan, for example.

U.S. Pat. No. 5,346,235 discloses a pivoting seat system that includes articulated linkage means for operatively moving a saddle to and securing the saddle at selected positions along a path relative to the bicycle frame between a predetermined standard riding position and a relatively more rearward position.

However there is a need for an improved adjustable saddle support for a bicycle, which provides an adjustment for a bicycle saddle upwards and towards the front of the bicycle, and downwards and towards the back of the bicycle.

BRIEF SUMMARY OF INVENTION

In one aspect of the present invention there is provided an adjustable saddle support that adjustably connects a conventional bicycle saddle with a conventional bicycle seat post. The conventional bicycle seat post has a conventional first saddle clamp mechanism. The adjustable saddle support comprises an adjustment mechanism that has a second saddle clamp mechanism and a support member which supports the adjustment mechanism. The adjustment mechanism adjustably engages the support member. There is also a pair of rails which have parallel spaced apart sections. The pair of rails is connected with the support member.

In another aspect of the present invention there is provided a support member for an adjustable saddle support. The adjustable saddle support adjustably connects a conventional bicycle saddle with a conventional bicycle seat post. The conventional bicycle seat post has a conventional first saddle clamp mechanism. The support member comprises a tubular member that has a length and a slot along a portion of the length thereof. The tubular member further includes at least two bores. There is also a pair of rails which have parallel spaced apart sections. The pair of rails is connected with the tubular member.

In another aspect of the present invention there is provided an adjustable saddle support for adjustably connecting a conventional bicycle saddle with a bicycle seat post shaft. The adjustable saddle support comprises a tubular member that has a length and a slot along a portion of the length thereof. There is also an adjustment mechanism which has a second saddle clamp mechanism and a piston mechanism. The piston mechanism is disposed within the tubular member. The second saddle clamp mechanism is disposed outside of the tubular member and includes an elongated member extending through the slot. The elongated member is connected with the piston mechanism. The adjustment mechanism adjustably engages the tubular member. There is also a post that is connected with the tubular member.

In another aspect of the present invention there is provided an adjustable saddle support that adjustably connects a conventional bicycle saddle with a conventional bicycle seat post. The conventional bicycle seat post has a conventional first saddle clamp mechanism. The adjustable saddle support comprises an adjustment mechanism that has a second saddle clamp mechanism, and a support member that supports the adjustment mechanism. The adjustment mechanism adjustably engages the support member in at least two positions. A path of travel of the adjustment mechanism between the two positions is nonlinear. There is also a pair of rails that have parallel spaced apart sections. The pair of rails is connected with the support member.

BRIEF DESCRIPTION OF DRAWINGS

The invention will be more readily understood from the following description of preferred embodiments thereof given, by way of example only, with reference to the accompanying drawings, in which:

FIG. 8 is a front elevation view of the adjustable saddle support of FIG. 1;

FIGS. 9 and 10 are top and bottom plan views respectively of a tubular member and support rails of the adjustable saddle support of FIG. 1;

FIGS. 11 and 12 are a top plan view and side elevation view respectively of a plunger of the adjustable saddle support of FIG. 1;

FIG. 13 is a cross sectional view of the plunger of FIG. 11 taken along line 11-11';

FIG. 14 is a partial cross sectional view of an adjustable saddle support according to another embodiment of the present invention taken along line 8-8' of FIG. 8;

FIG. 15 is an alternative cross-sectional view of the piston of FIG. 14;

FIG. 18 is an elevational view of a piston of the adjustable saddle support of FIG. 16;

FIG. 19 is a cross-sectional view of the piston of FIG. 18 taken along line 20-20';

FIG. 20 is an elevational view of a saddle clamp mechanism of the adjustable saddle support of FIG. 16;

FIG. 21 is a cross-sectional view of the saddle clamp mechanism of FIG. 20 taken along line 22-22';

FIG. 26 is a view in perspective of a rail support bushing of the adjustable saddle support of FIG. 22;

DESCRIPTION OF THE PREFERRED EMBODIMENTS

Figure 1:
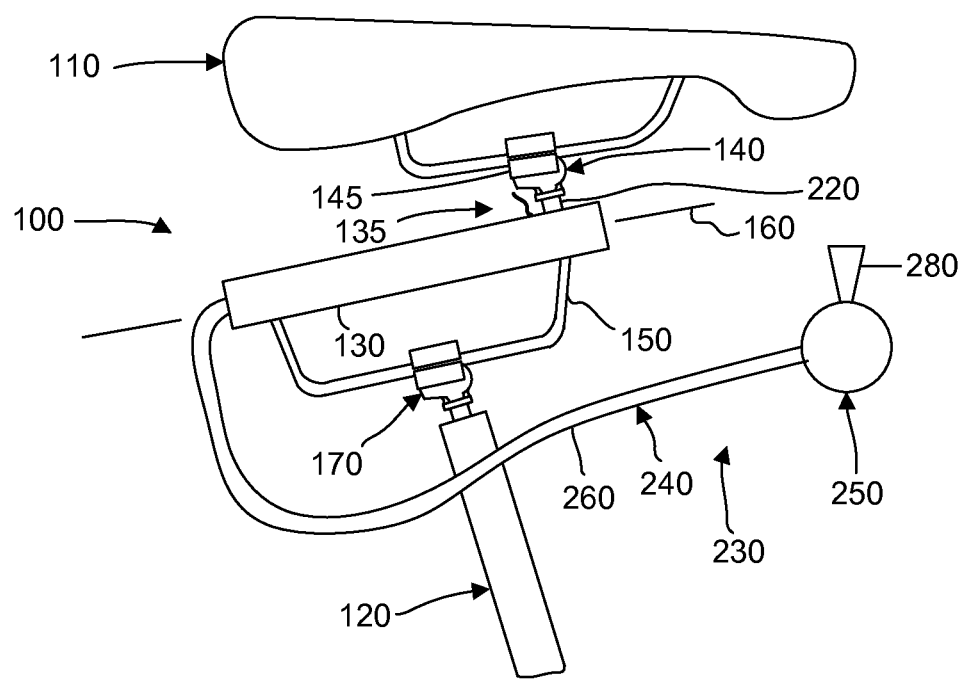
FIGS. 1, 2 and 3 are side elevation views of an adjustable saddle support connected with a saddle and with a seat post shown in an elevated position, neutral position and lowered position respectively in one embodiment of the present invention.
Figure 2:
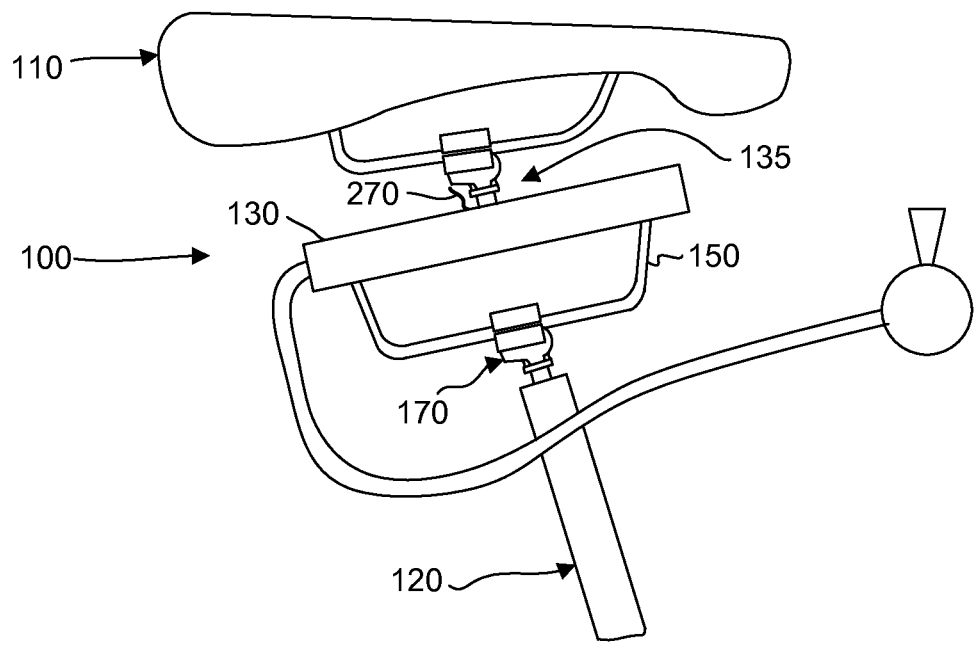
Figure 3:
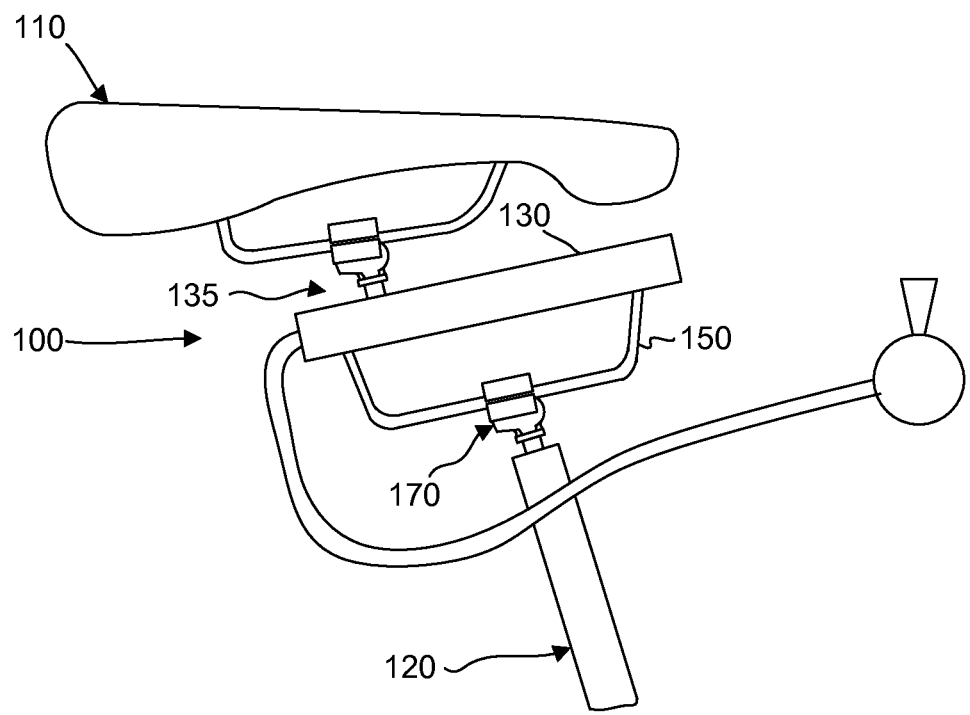

Referring to the figures and first to FIGS. 1, 2 and 3 there is an adjustable saddle support indicated generally by reference numeral 100. The adjustable saddle support 100 is connected with a conventional saddle 110 and with a conventional seat post 120. The adjustable saddle support 100 allows the saddle 110 to be adjusted in position with respect to the seat post 120. The saddle 110 is shown in an elevated position, a neutral position and a lowered position in FIGS. 1, 2 and 3 respectively. In other embodiments, there can be at least two positions in which the saddle 110 can be adjusted, and possibly more.

The adjustable saddle support 100 includes an elongated tubular member 130, an adjustment mechanism indicated generally by reference numeral 135 and support rails 150. The tubular member 130 acts as a support for the adjustment mechanism 135. The tubular member 130 is cylindrical in cross-section in this example. However different cross-sections are possible in other examples, e.g. square or oval. The adjustment mechanism 135 includes a seat clamp mechanism indicated by reference numeral 140. The seat clamp mechanism 140 includes a conventional saddle clamp 145 that connects with the saddle 110. The adjustment mechanism 135 is partially disposed within the tubular member 130, as will be explained in more detail below, and is adjustably connected with the tubular member 130 along longitudinal axis 160.

The support rails 150 include substantially parallel spaced apart sections and are connected with the tubular member 130, and are shown in an alternative view in FIG. 8. The seat post 120 includes a conventional seat clamp 170. The support rails 150 connect with the seat clamp 170 and are secured therewith. Note that the words seat and saddle are used interchangeably throughout this document.

Referring to FIGS. 9 and 10, the tubular member 130 includes a slot 180 on one side, and bores 190, 200 and 210 on an opposite side. Referring back to FIG. 1, the seat clamp mechanism 140 includes a rod 220. The rod 220 slides back and forth in the slot 180 of the tubular member 130. The bores 190, 200 and 210 are used to fix the adjustment mechanism 135 in one of the positions of FIG. 1, 2 or 3, as will be described in more detail below.

The adjustable saddle support 100 also includes an activation mechanism indicated generally by reference numeral 230 which is used to activate the adjustment of the adjustable saddle support between the lowered, neutral and elevated positions. The activation mechanism 230 includes a bike cable assembly 240 and a lever mechanism 250. The bike cable assembly 240 includes a cable housing 260 and a cable 270, seen in FIGS. 1, 5 and 7. In other embodiments the activation mechanism is not required, and a manual adjustment can be accomplished instead, as will be understood after reading the description below.

The lever mechanism 250 includes a lever 280. One end of the cable 270 is connected with the lever 280 in a conventional manner. The opposite end of the cable is connected with the adjustable saddle support 100 and is described in more detail below. The cable 270 is made taut or slackened by adjusting the lever 280.

Figure 5:
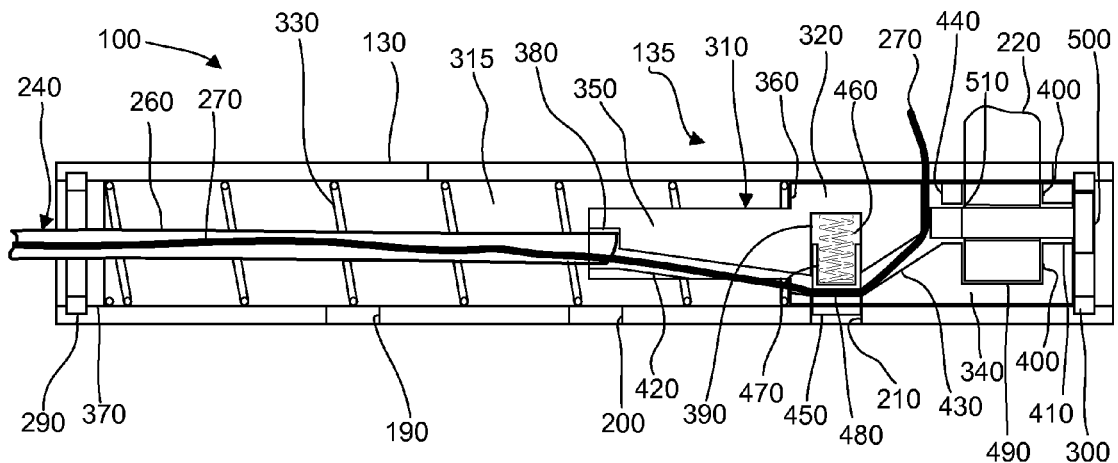
FIGS. 5 and 6 are partial cross sectional views of the adjustable saddle support of FIGS. 1 and 3 respectively taken along line 8-8' of FIG. 8.
Figure 7:
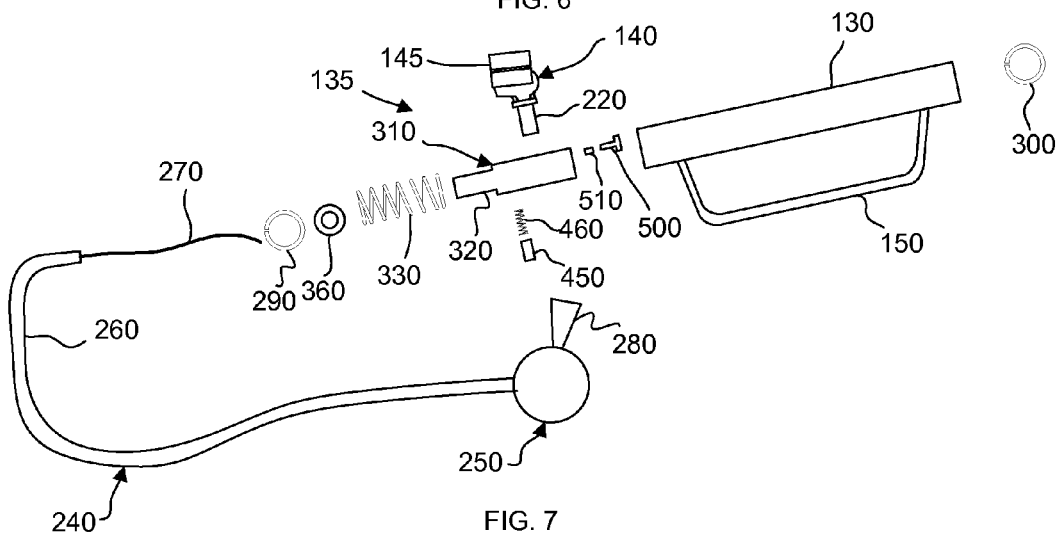
FIG. 7 is an exploded view of the adjustable saddle support of FIG. 1.

Referring now to FIGS. 5 and 7, the adjustable saddle support 100 is described in more detail. The tubular member 130 has retaining rings 290 and 300 at opposite ends. The adjustment mechanism 135 includes a piston mechanism indicated generally by reference numeral 310, which slides back and forth along an inner wall 315 of the tubular member 130. The retaining rings 290 and 300 are used to contain the piston mechanism 310 within the tubular member 130.

An end opposite the one end of the cable 270 is fixed to the piston mechanism 310, which is described in more detail below. The piston mechanism 310 allows the saddle clamp mechanism 140 to be adjusted along the axis 160 when the lever 280 activates the cable 270.

The piston mechanism 310 includes a cylindrical piston 320 and a helical compression spring 330. The piston 320 includes sections 340 and 350 which are coaxial along the axis 160, and where the section 350 is smaller in diameter than the section 340. A wall 360 is formed at the boundary between the sections 340 and 350.

One end of the spring 330 abuts a washer 370 adjacent the retaining ring 290, and the other end abuts the wall 360, thereby enveloping the section 350 of the piston 320. The helical compression spring 330 biases the piston 320 towards the retaining ring 300. In other embodiments of the invention the washer 370 is unnecessary if the retaining ring 290 has a suitable inner diameter to engage the spring 330. Furthermore, in other embodiments a helical extension spring can be used in a similar, but opposite fashion to the helical compression spring 330.

Referring now to FIG. 5, the piston 320 includes bores 420, 430 and 440 which act as guides for the cable 270. The cable 270 is fed through the bores 420, 430 and 440 and secured to the piston 320. The manner in which the cable 270 is secured to the piston 320 is described in more detail below. There is also a bore 380 which acts as a support for the cable housing 260.

The piston 320 further includes a bore 390. The piston mechanism 310 further includes a plunger 450 and a helical compression spring 460. The spring 460 resides in the bore 390 and biases the plunger 450 out of the bore 390 towards the tubular member 130. The plunger 450 is received in one of the bores 190, 200 and 210 and thereby secures the adjustment mechanism 135 in position with respect to the tubular member 130.

Referring now to FIGS. 5, 11, 12 and 13, the plunger 450 is described in more detail. The plunger 450 includes bores 470 and 480. The bore 470 receives one end of the spring 460 and acts as a spring support. The bore 480 receives the cable 270 and acts as a cable guide. The cable 270 prevents the plunger 450 from travelling completely out of the bore 390 due to the spring 460 and the effects of gravity. The bores 420 and 430 are generally oriented transversely to the plunger 450 and bore 470.

Referring again to FIG. 5 the piston 320 includes a bore 400. The rod 220 of the seat clamp mechanism 140 is received by the bore 400. Note that the rod 220 is cylindrical in this example which mutually engages the bore 400, which is also circular in shape. In other examples the cylindrical rod 220 can be oblong in shape with the elongated dimension running along the length of the slot 180, which thereby distributes the lateral force of the rod 220 along an edge of the slot 180.

The rod 220 has a threaded bore 490. The piston mechanism 310 also includes a bolt 500 and a slug 510. The bolt 500 is threadedly received by the bore 490 pressing the slug 510 into a wall of the bore 440 thereby securing the cable 270 to the piston 320.

Figure 6:
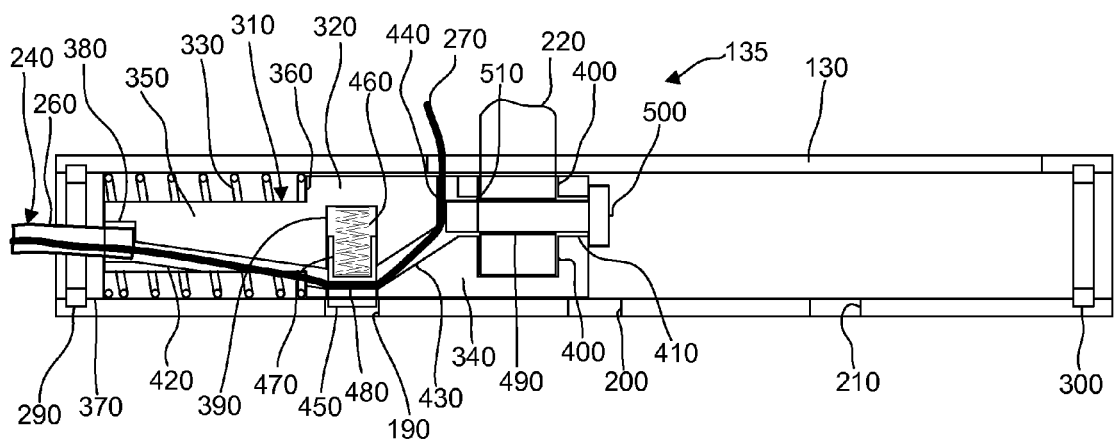

In operation, a cyclist adjusts the position of the saddle 110 by adjusting the saddle support 100. As seen in FIGS. 3 and 6, the saddle is in the lowered position. In order to adjust the saddle 110 to an elevated position the cyclist pulls on the lever 280 thereby pulling the cable 270 taut. The plunger 450 is retracted into the bore 390 when the cable 270 is pulled taut thereby resisting the bias of and compressing the spring 460. The spring 330 begins to move the piston 320 and therefore the saddle 110 towards the retaining ring 300 as soon as the plunger 450 clears the bore 190.

The cyclist can relax the lever 280 when the saddle 110 begins to move towards the retaining ring 300. The cyclist must wait until the plunger 450 moves past the bore 200 before relaxing the lever 280 if the cyclist wishes to adjust the saddle into the uppermost elevated position. The spring 460 moves the plunger 450 towards the tubular member 130 out of the bore 390 as soon as the lever 280 is relaxed. The plunger 450 will be thrust into one of the bores 200 or 210 by the spring 460 as soon as the plunger is lined up over one such bore, which will then lock the piston 320 and therefore the saddle 110 in place.

To adjust the saddle 110 to one of the lower positions from one of the higher positions, the cyclist must apply downward pressure on the saddle 110 when the piston 320 is free to move within the tubular member 130. The downward pressure from the cyclist must overcome the bias of the spring 330 in order to compress the spring 330 and move the piston 320 downwardly in the tubular member 130.

Referring now to FIGS. 14 and 15, there is shown another embodiment of the present invention wherein like parts to the previous embodiment have like reference numerals with the additional suffix "0.14". The bore 390.14 is coaxial with the bore 400.14 along axis 700.

The rod 220.14, which is received by the bore 400.14, includes a bore 710. The bore 710 receives the spring 460.14 and the plunger 450.14. Note that in other embodiments the rod 220.14 does not need to have the bore 710 when the diameter of the cylindrical section 340.14 is large enough to accommodate that configuration. In still further embodiments the bore 710 can be of sufficient length that the plunger 450 extends beyond the perimeter of the section 340.14 of the piston 320.14. This has the advantage of improved alignment for the plunger.

Note that the rod 220.14 is cylindrical in this example which mutually engages the bore 400.14, which is also circular in shape. In other examples the cylindrical rod 220.14 can be oblong in shape with the elongated dimension running along the length of the slot 180 in FIG. 9, which thereby distributes the force of the rod 220.14 along an edge of the slot 180.

The section 340.14 of the piston 320.14 includes a bore 720. The rod 220.14 includes a threaded bore 730. A set screw 740 is inserted through the bore 720 and is threadedly received by the bore 730 thereby securing the rod 220.14 to the piston 320.14. The set screw 740 also prevents rotation of the rod 220.14 with respect to the piston 320.

The piston 320.14 has a section 750 adjacent the cylindrical section 340.14. The section 750 has a bore 760 which in combination with the bores 420.14 and 430.14 acts as a cable guide. The section 750 also has a threaded bore 770. A set screw 780 is threadedly received by the bore 770, and is adjusted to secure the cable 270.14 against a wall of the bore 760 thereby securing the cable to the piston 320.14 of the adjustment mechanism 135.14.

Figure 4:
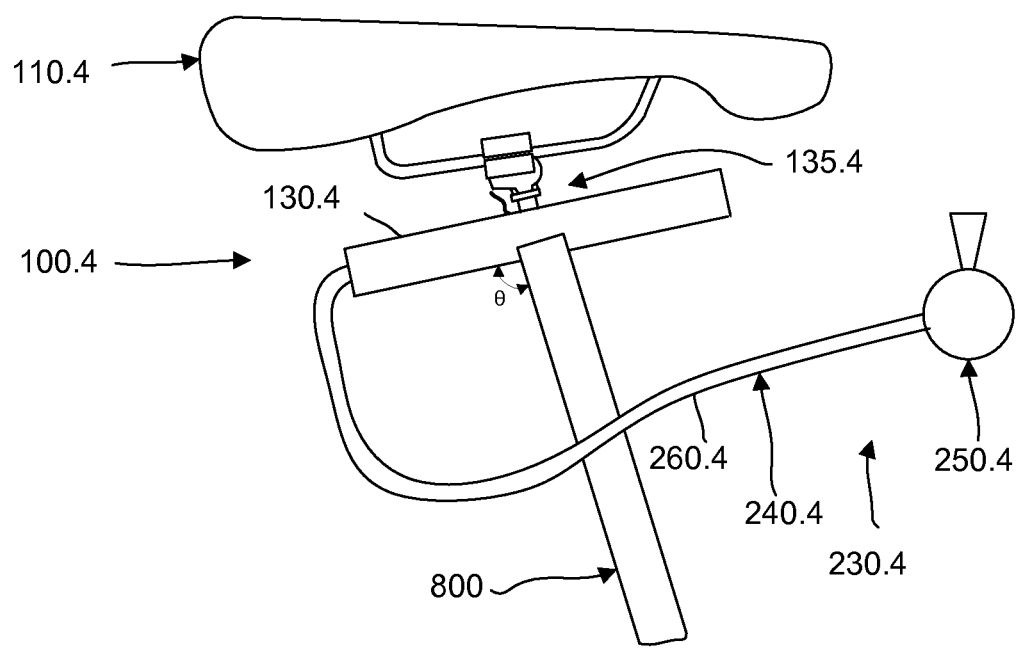
FIG. 4 is a side elevation view of an adjustable saddle support connected with a saddle according to another embodiment of the present invention.

Referring now to FIG. 4, there is shown another embodiment of the present invention wherein like parts to the previous embodiments are shown with like reference numerals with an additional suffix of "4". The adjustable saddle support 100.4 includes a seat post 800 connected with the tubular member 130.4, forming an angle θ between them. This embodiment is advantageous when the fixed angle θ is sufficient between the tubular member 130.4 and the seat post 800.

Figure 16:
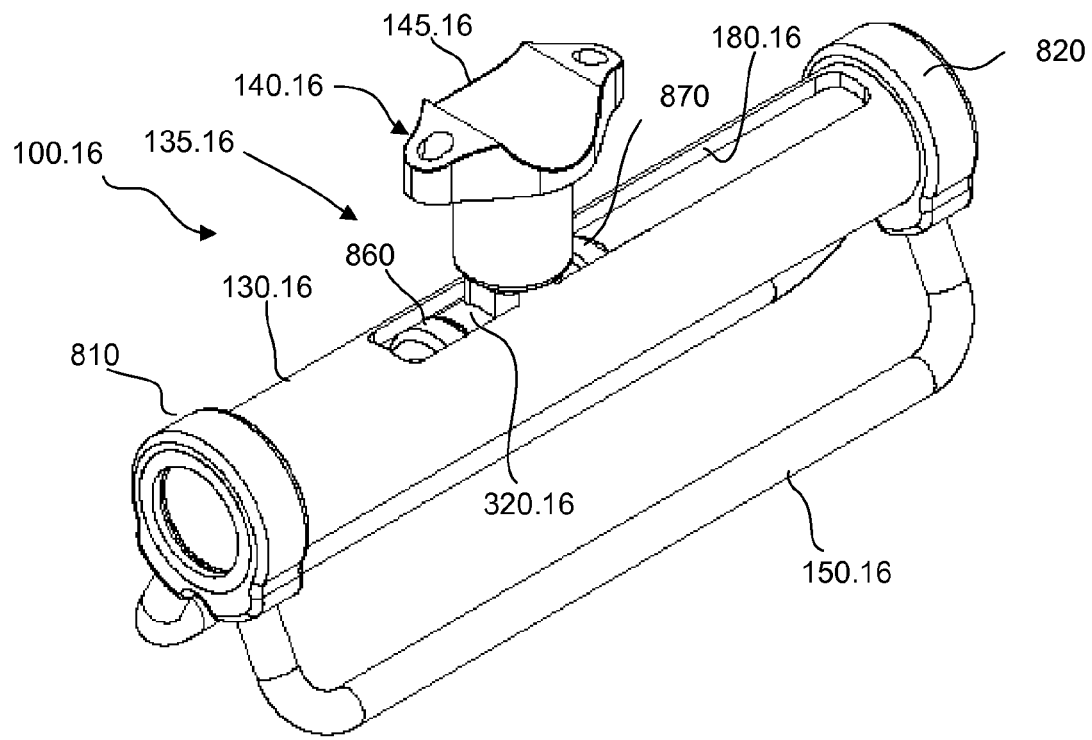
FIG. 16 is a partial view in perspective of an adjustable saddle support according to another embodiment of the present invention.
Figure 17:
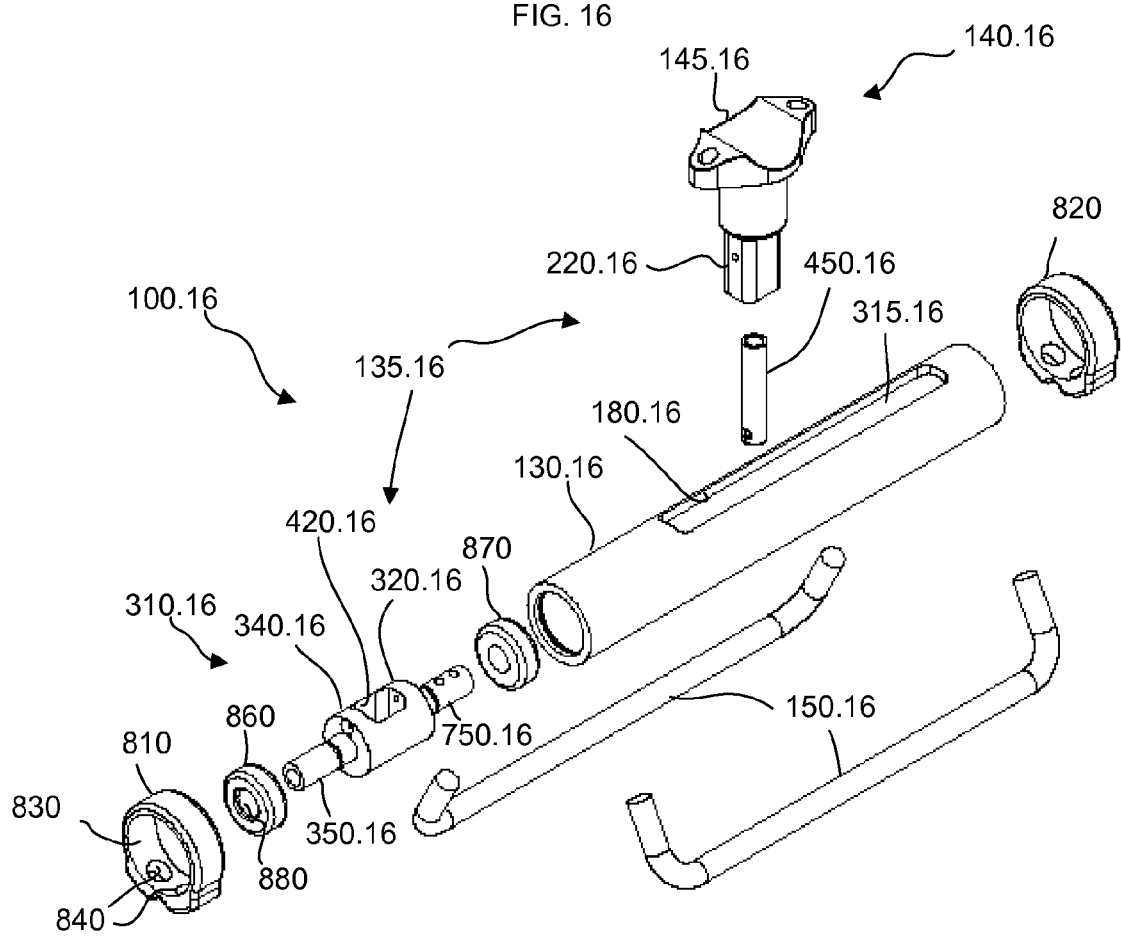
FIG. 17 is an exploded view of the adjustable saddle support of FIG. 16.

Referring now to FIGS. 16 and 17, there is shown another embodiment of the present invention wherein like parts to previous embodiments have like reference numerals including the suffix "16". This embodiment is similar to previous embodiments and only the differences are discussed. The adjustable saddle support 100.16 includes a pair of bushings 810 and 820 at opposite ends of the tubular member 130.16. The bushings 810 and 820 are similar and only one is discussed herein.

The bushing 810 includes a bore 830 through which the tubular member 130.16 is inserted. The connection between the bushing 810 and the tubular member 130.16 is an interference fit, and can be achieved by press-fitting the bushing 810 onto the tubular member 130.16 by super-heating the bushing and/or freezing the tubular member so that their diameters increase and decrease respectively. In other embodiments the bushings 810 and 820 can be connected with the tubular member 130.16 by an adhesive, or a weld. In still other embodiments the bushings 810 and 820 and the tubular member 130.16 can be formed from a common tube.

The bushing 810 also includes bores 840. The support rails 150.16 are inserted into the bores 840 and secured therewith, for example by an adhesive or a weld. The bushings 810 and 820 have the advantage of connecting the rails 150.16 with the tubular member 130.16 in a convenient manner that does not affect the diameter of the tubular member, e.g. like would happen if welding the rails directly to the tubular member.

Referring now to FIGS. 17, 19 and 21 the piston mechanism 310.16 includes bushings 860 and 870 that abuts against the section 340.16 of the piston 320.16 which is described in more detail below. The bushings 860 and 870 are cylindrical in shape and have a diameter that is greater than the diameter of the section 340.16, and therefore the bushings abut against the inner wall 315.16 of the tubular member 130.16 shown in FIGS. 16 and 17, whereas the section 340.16 does not.

The bushings 860 and 870 have a lower coefficient of friction than the section 340.16 of the piston 320.16, and therefore allow for improved adjustment of the piston along the inner wall 315.16. The bushings 860 and 870 include a bore 880 into which section 350.16 and section 750.16 of the piston 320.16 are inserted respectively.

Referring to FIG. 19 the piston 320.16 has grooves 890 and 900 in the sections 350.16 and 750.16 respectively. External retaining rings, not shown, are inserted into the grooves 880 and 890 to secure the bushings 860 and 870 against the section 340.16 respectively.

Referring again to FIGS. 17, 19 and 21 the bore 420.18 has a rectangular cross-section, and mates with the rod 220.16. The rectangular rod has the advantage of distributing lateral force along the slot 180.16 of the tubular member 130.16 seen in FIGS. 16 & 17.

Note that only a portion of the conventional saddle clamp 145.16 of the seat clamp mechanism 140.16 is shown in FIGS. 16, 17, 20 and 21. The portions not shown are those that interface with the rails of the saddle. Furthermore, the activation mechanism 230 is not shown in the illustrations of the present embodiment, but it is understood that the present embodiment includes this mechanism in a similar matter discussed previously. Further embodiments similar to this one may not use an activation mechanism however.

Figure 22:
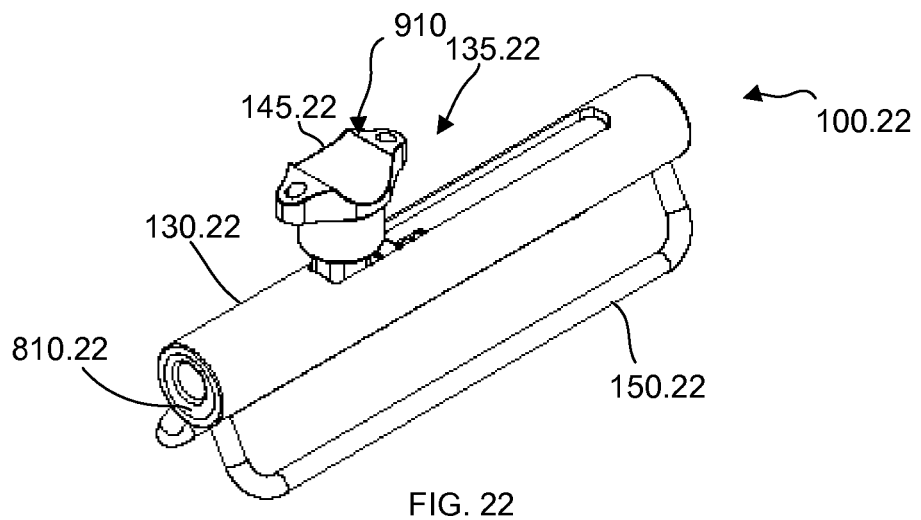
FIG. 22 is a partial view in perspective of an adjustable saddle support according to another embodiment of the present invention.
Figure 23:
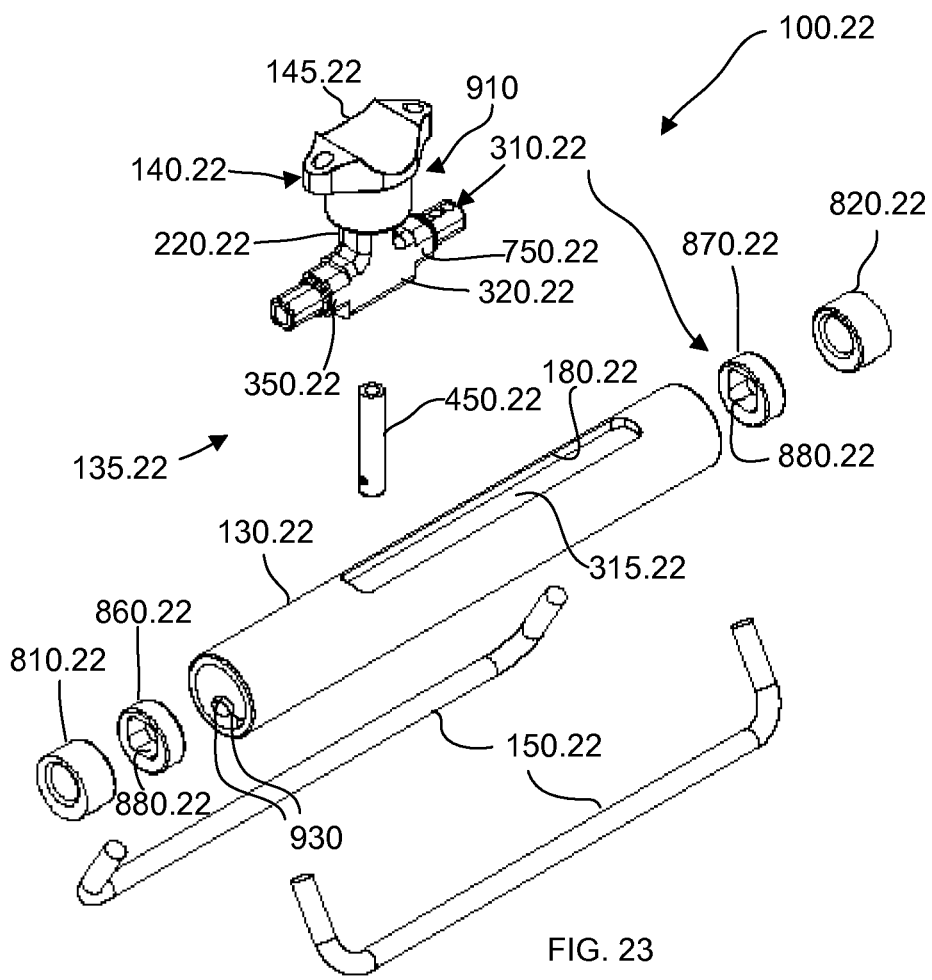
FIG. 23 is an exploded view of the adjustable saddle support of FIG. 22.
Figures 24, 25:
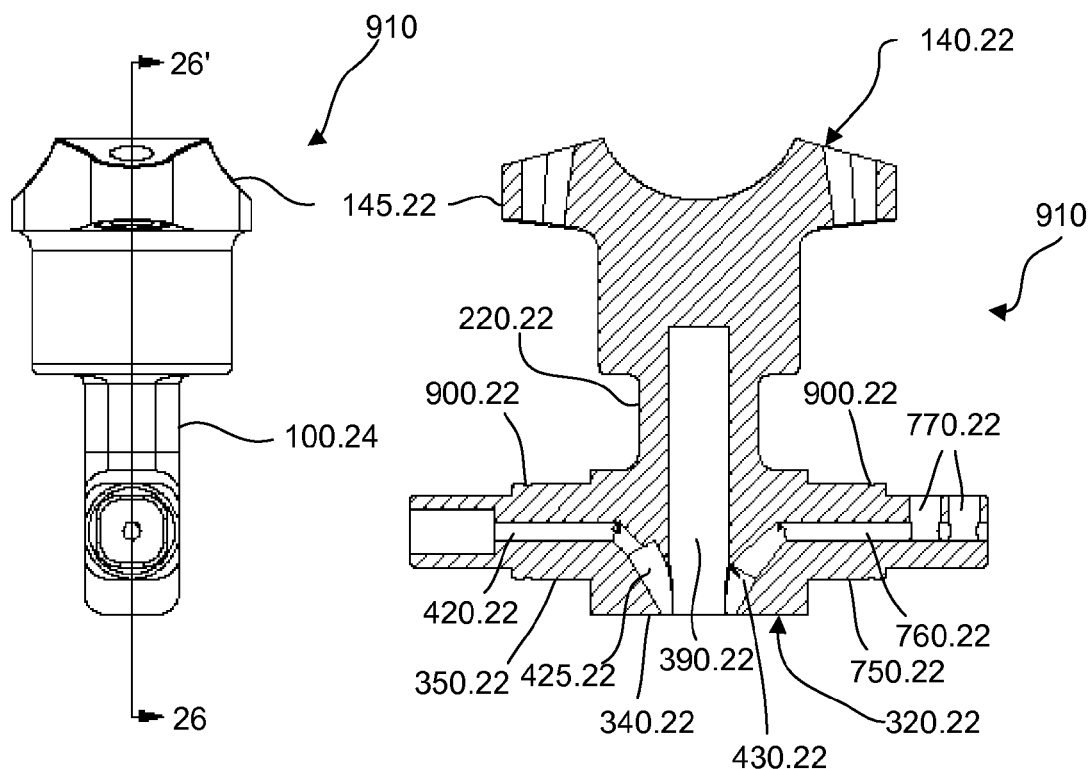
FIG. 24 is an elevational view of a piston seat clamp mechanism of the adjustable saddle support of FIG. 22.
FIG. 25 is a cross-sectional view of the piston seat clamp mechanism of FIG. 24 taken along line 26-26'.

Referring now to FIGS. 22 and 23, there is shown another embodiment of the present invention wherein like parts have like reference numerals with an additional suffix "22". This embodiment is similar to previous embodiments and only the differences are discussed. The adjustable saddle support 100.22 includes a piston seat clamp mechanism 910, which is in part a unified, integrated combination of the seat clamp mechanism 140.22 and the piston mechanism 310.22. To assemble the adjustable saddle support 100.22, the piston 320.22 of the piston seat clamp mechanism 910 is inserted through the slot 180.22. The bushings 860.22 and 870.22 are inserted at opposite ends of the tubular member 130.22. The bores 880.22 of the bushings 860.22 and 870.22 mutually engage the sections 350.22 and 750.22 respectively of the piston seat clamp mechanism 910.

The bushings 860.22 and 870.22 support the piston seat clamp mechanism 910 within the tubular member 130.22 such that only the bushings engage the inner wall 315.22 of the member 130.22. Additional support is provided by the rod 220.22 of the piston seat clamp mechanism 910 which abuts against respective walls of the slot 180.22.

Figures 27, 28, 29, 30:
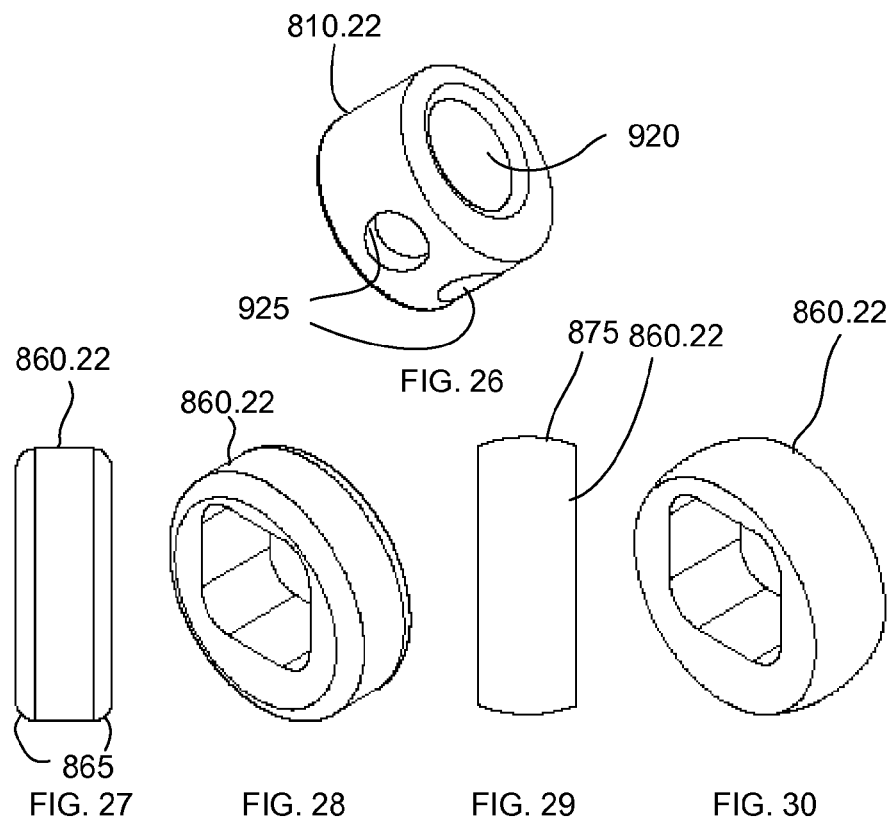
FIG. 27 is an elevational view of a piston support bushing of the adjustable saddle support of FIG. 23.
FIG. 28 is a view in perspective of the piston support bushing of FIG. 27.
FIG. 29 is an elevational view of an alternative piston support bushing of the adjustable saddle support of FIG. 23.
FIG. 30 is a view in perspective of the piston support bushing of FIG. 29.

Referring now to FIGS. 27 and 28 the bushing 860.22 is shown in more detail. The bushing 860.22 has rounded edges 865 that provide greater compliance when translating within the tubular members 130.22. FIGS. 29 and 30 show an alternative embodiment of the bushing 860.22. The bushing 860.22 in FIG. 29 has a circular profile 875 that has a diameter that is slightly less than the inner diameter of the tubular member 130.22. No matter what the orientation of the bushing 860.22 in FIG. 29 within the tubular member 130.22 its maximum span will not be greater than the inner diameter of the tubular member.

Referring now to FIG. 26, bushings 810.22 and 820.22 each include a bore 920 and a pair of angularly spaced apart blind bores 925. The blind bores 925 do not penetrate to the depth of the bore 920, and are therefore not exposed all the way through.

Referring again to FIGS. 22 and 23, the bushings 810.22 and 820.22 are inserted into the tubular member 130.22 at opposite ends thereof. The tubular member 130.22 has corresponding bores 930 at opposite ends. The respective ends of the rails 150.22 are inserted through the respective bores 930 of the tube 130.22 and into the respective blind bores 925 of the bushings 810.22 and 820.22 and secured therewith, e.g. by an adhesive or a weld.

The bushing 810.22 also serves to support the helical compression spring 330 as seen in previous embodiments. Note that the analogs of the helical compression springs 330 and 460 as seen in FIG. 7 are not shown in the illustrations of the present embodiment. However their presence is required and is explicitly understood. Furthermore, the activation mechanism 230 is not shown in the illustrations of the present embodiment, but it is understood that the present embodiment includes this mechanism in a similar matter discussed previously. Further embodiments similar to this one may not use an activation mechanism however.

Note that the present embodiment can use the alternative arrangement of the external bushings 810.16 and 820.16 seen FIG. 16 to support the rails 150.22, in addition to an internal retaining ring to contain the helical compression spring 330 in between the piston seat clamp mechanism 910 and the retaining ring.

Note that only a portion of the conventional saddle clamp 145.22 of the saddle clamp mechanism 140.22 is shown in FIGS. 22, 23, 24 and 25. The portions not shown are those that interface with the rails of the saddle.

Figure 31:
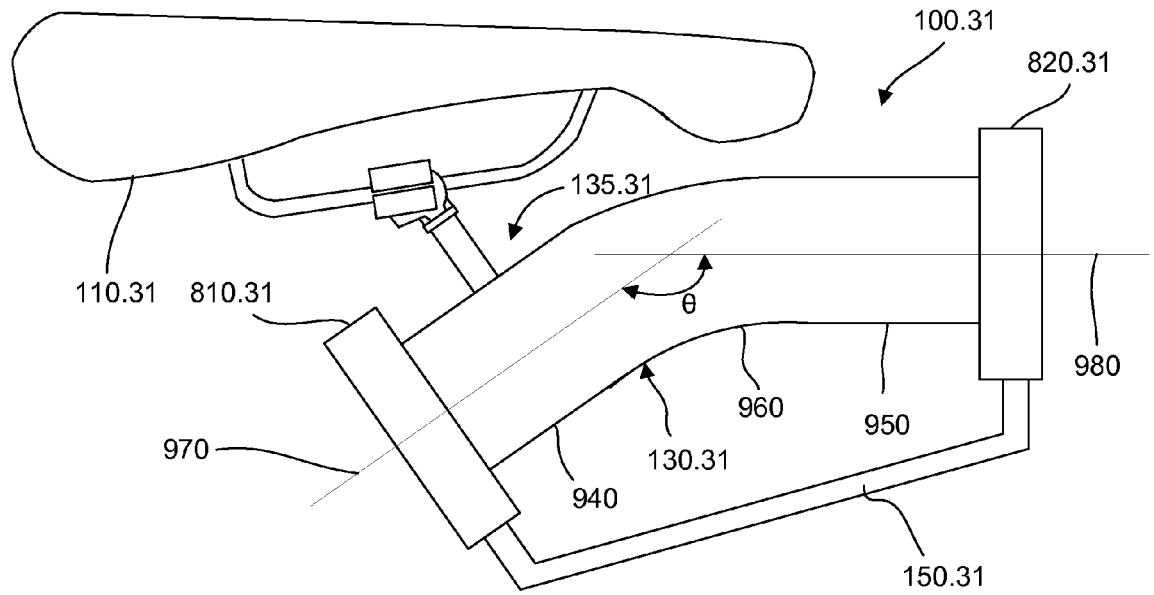
FIG. 31 is a simplified front elevation view of an adjustable saddle support shown in a lowered position according to another embodiment of the present invention.
Figure 32:
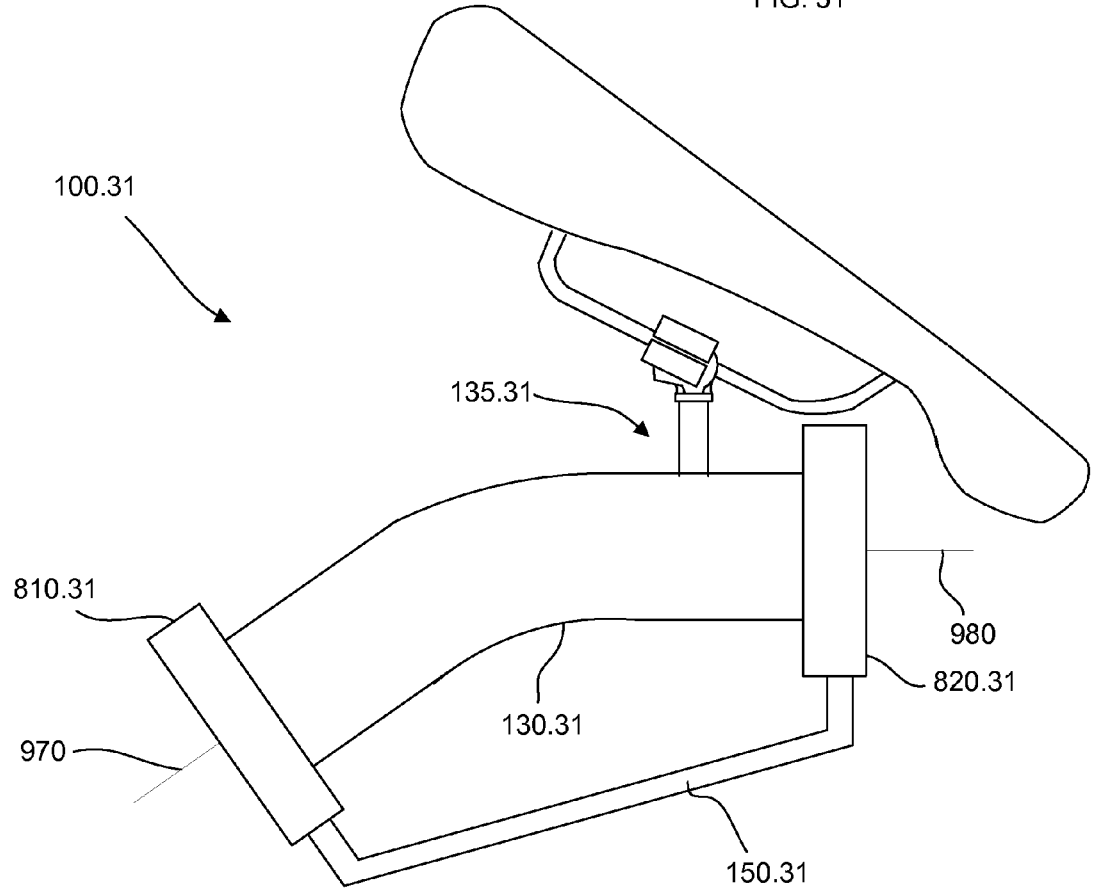
FIG. 32 is a simplified front elevation view of the adjustable saddle support of FIG. 31 shown in an elevated position.

Referring now to FIGS. 31 and 32, there is shown another embodiment of the present invention wherein like parts have like reference numerals including the suffix "31". This embodiment is similar to previous embodiments and only the differences are discussed. The tubular member 130.31 includes straight sections 940 and 950, and a bent section 960. The straight sections 940 and 950 have longitudinal axes 970 and 980 respectively, disposed at an angle 8 with respect to each other. The path of travel of the adjustment mechanism 135.31 along the tubular member 130.31 is therefore nonlinear.

This provides a two-fold advantage when cycling on hills. First, there is an advantage in moving the saddle more over the bottom bracket without changing the saddle distance from the bottom bracket when cycling uphill. Second, there is an additional advantage in making the saddle angle more level when cycling uphill so that energy is not wasted trying to remain firmly seated when pedalling. Note that when cycling uphill on a conventional bicycle there is a tendency to slide towards the rear of the saddle, especially when pedalling. Similarly, when cycling downhill there is an advantage in moving the saddle back and down with respect to the bottom bracket to achieve a more stable and streamlined position on the bike.

The bushings 860 and 870 of FIG. 17, or the bushings 860.22 and 870.22 of FIG. 23, are not required to travel in the bent section 960 in order for the saddle angle to change when the saddle is adjusted along the tubular member 130.31. However it is possible providing they are compliant within the bent section.

Figure 33:
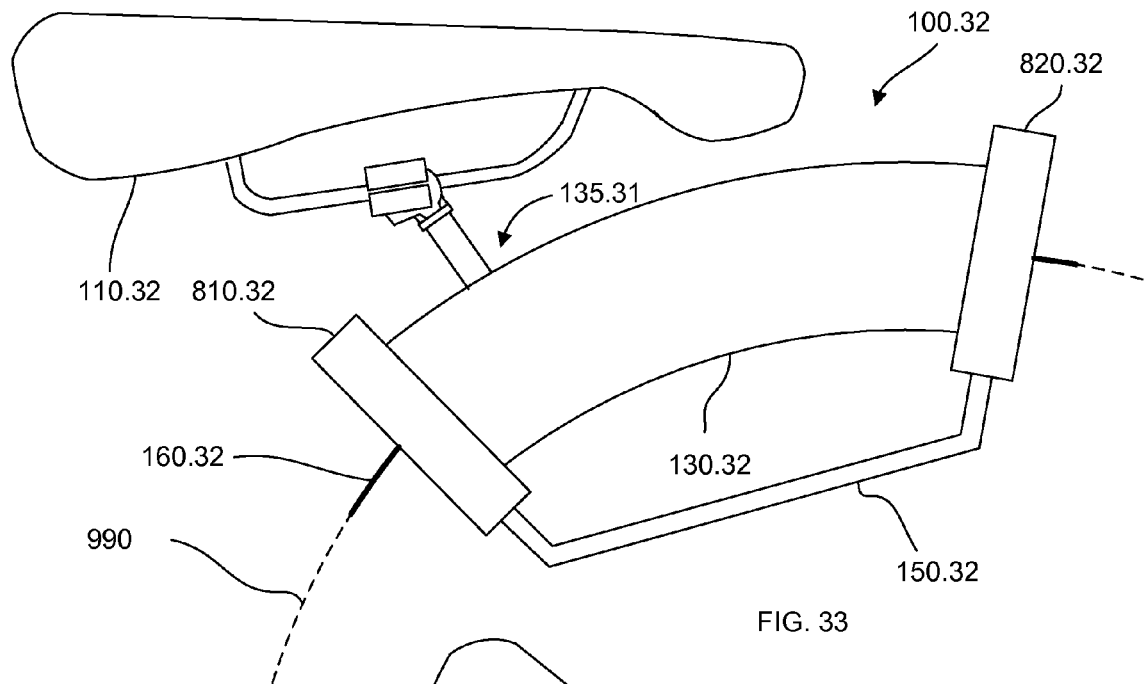
FIG. 33 is a simplified front elevation view of an adjustable saddle support shown in a lowered position according to another embodiment of the present invention.
Figure 34:
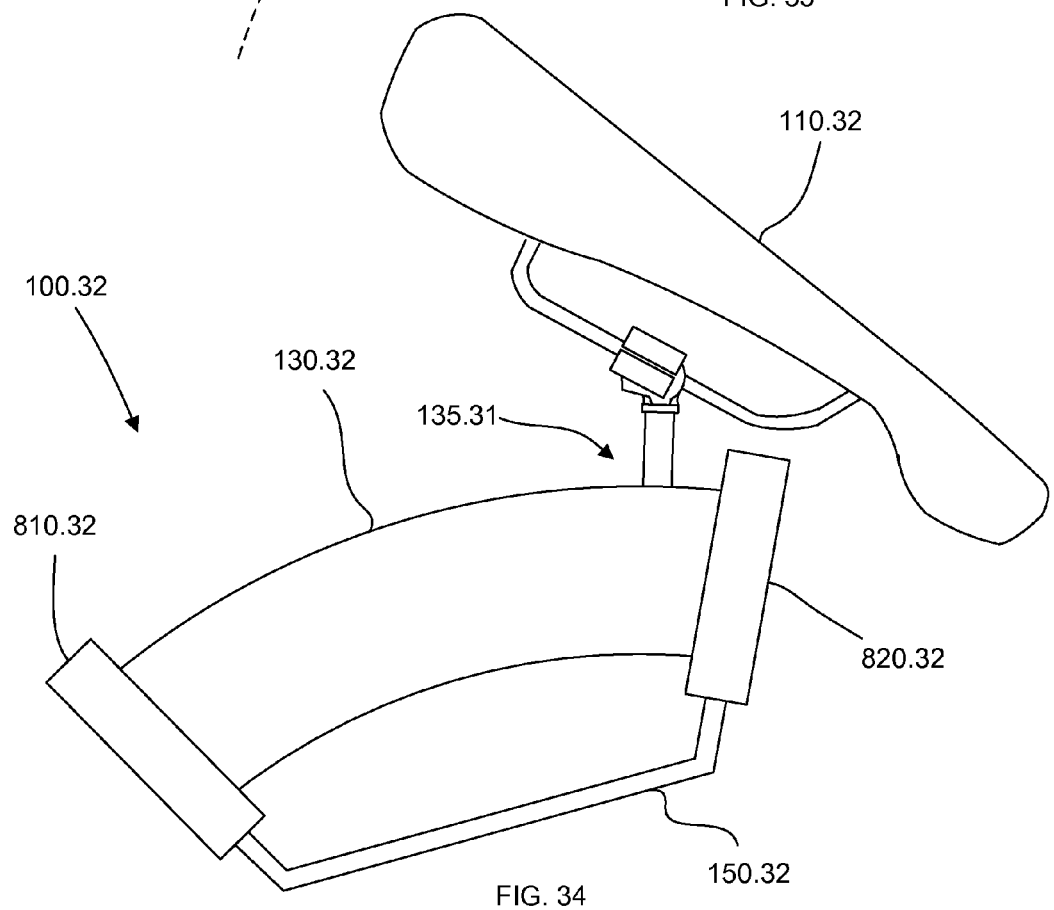
FIG. 34 is a simplified front elevation view of the adjustable saddle support of FIG. 33 shown in an elevated position.

Referring now to FIGS. 33 and 34, there is shown another embodiment of the present invention wherein like parts have like reference numerals including the suffix "33". This embodiment is similar to previous embodiments and only the differences are discussed. The centerline axis 160.33 of the tubular member 130.33 follows the circumference of a circle 990, thereby providing a different seat angle for the saddle 110.33 at different positions there along. The path of travel of the adjustment mechanism 135.33 along the tubular member 130.33 is therefore nonlinear.

The piston 320.16 of FIG. 17 and the piston seat clamp mechanism 910 of FIG. 23 are amenable to the tubular members 130.31 and 130.33 of FIGS. 31 and 33 respectively providing they are compliant with the angular travel. Compliance is possible with the piston 320.16 since the bushings 860 and 870 of FIG. 17 support the piston within the tubular member 130.16. Thereby a suitable clearance between the piston 320.16 and the inner wall 315.16 of the tubular members 130.31 and 130.33 can be selected for compliance. Similarly, compliance is possible with the piston seat clamp mechanism 910 since the bushings 860.22 and 870.22 of FIG. 23 support the piston seat clamp within the tubular member 130.22.

Figure 35:
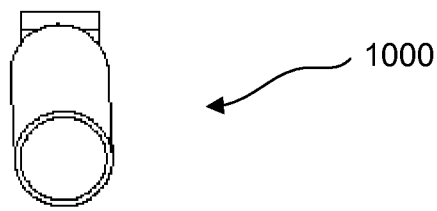
FIG. 35 is a front elevation view of a handle bar stem according to another embodiment of the present invention.
Figure 36:
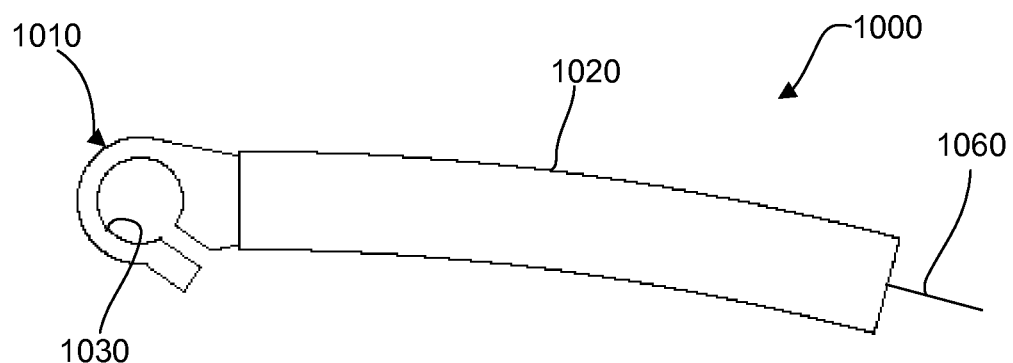
FIG. 36 is a side elevation view of the handle bar stem of FIG. 35.
Figure 37:
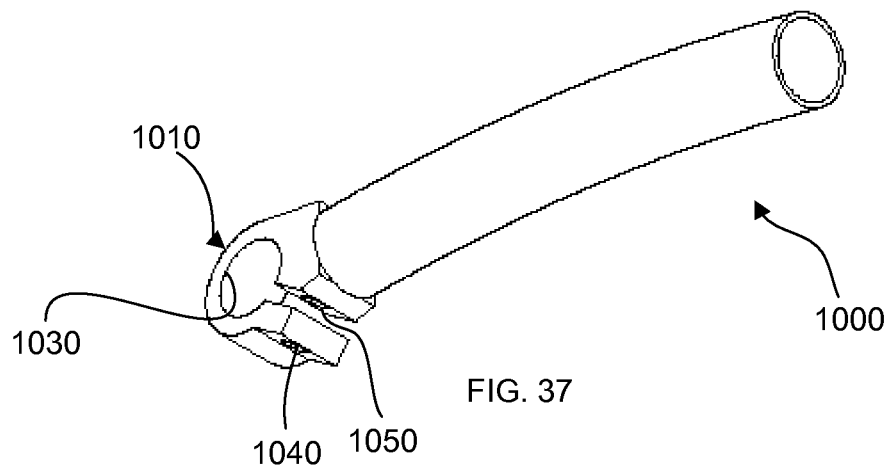
FIG. 37 is a view in perspective of the handle bar stem of FIG. 35.

Referring now to FIGS. 35, 36 and 37, there is shown a handle bar stem 1000. A pair of the stems 1000 is used in conjunction with a single handle bar of a bicycle. The stem 1000 includes a clamp portion 1010 and tubular member 1020. The clamp includes a bore 1030 into which the ends of the handle bar are inserted. The clamp 1010 further includes bores 1040 and 1050 into which a bolt, not shown, is threaded to secure the handle bar stem 1000 to the handle bar.

The tubular member 1020 has a centerline axis 1060. The axis 1060 follows the circumference of a circle having a diameter similar to the diameter of the circle 990 in FIG. 33. As the saddle is adjusted from the lower position to the upper position by the adjustable saddle support 100, the rider can then comfortably engage the ends of the handle bar stem 1000 whereby the angle between the rider's torso and arms remains substantially the same.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof. As is readily apparent the system and method of the present invention is advantageous in several aspects.

What is claimed is:

1. An adjustable saddle support of the type providing fore and aft adjustments for adjustably connecting a saddle with a bicycle, comprising:
   a tubular member comprising a slot partially along its length;
   an adjustment mechanism slidably arranged within the tubular member and securably engageable thereto in at least two positions, the adjustment mechanism extending through the slot and comprising a seat clamp for the saddle;
   a lever for actuating the adjustable saddle support;
   a cable comprising a first end and a second end, the first end of the cable connected to the lever, the second end of the cable connected to the adjustment mechanism;
   wherein when the lever is actuated the cable activates the adjustment mechanism to disengage from the tubular member such that the adjustment mechanism and the second end of the cable can slidably move along a longitudinal axis of the tubular member.

2. The adjustable saddle support of claim 1, wherein the second end of the cable extends through one end of the tubular member to the adjustment mechanism.

3. The adjustable saddle support of claim 1, wherein the tubular member comprises an inner wall and at least two bores in said inner wall spaced apart along the longitudinal axis, the adjustment mechanism comprises a plunger biased towards the inner wall such that as the adjustment mechanism slides along the longitudinal axis of the tubular member the plunger engages one of the at least two bores thereby securing the adjustment mechanism to the tubular member.

4. The adjustable saddle support of claim 3, wherein the plunger comprises a cable bore extending along a transverse axis of the plunger, the second end of the cable extending through the cable bore and secured to the adjustment mechanism.

5. The adjustable saddle support of claim 3, wherein the adjustment mechanism comprises a plunger bore and a spring, the spring and the plunger received in the plunger bore such that the spring urges the plunger out of the plunger bore towards the inner wall of the tubular member.

6. The adjustable saddle support of claim 1, wherein the adjustment mechanism comprises first and second sections at opposite ends thereof and coaxial with the longitudinal axis of the tubular member, further comprising first and second bushings having respective bores therethrough, the first section of the adjustment mechanism extending through the bore of the first bushing and the second section extending through the bore of the second bushing such that the adjustment mechanism is supported by the first and second bushings within the tubular member.

7. The adjustable saddle support of claim 1, wherein the adjustment mechanism is biased towards an end of the tubular member.

8. The adjustable saddle support of claim 1, further comprising a spring within the tubular member between one end of the tubular member and the adjustment mechanism, the spring urging the adjustment mechanism away from the one end.

9. The adjustable saddle support of claim 8, further comprising a retaining ring at the one end of the tubular member retaining the spring therein.

10. The adjustable saddle support of claim 8, wherein the spring is a helical compression spring.

11. The adjustable saddle support of claim 1, further comprising a post connected to the tubular member along its length, the post receivable by a seat post receptacle of the bicycle.

12. The adjustable saddle support of claim 1, wherein the adjustment mechanism comprises a single piece member comprising:
   a central section disposed within the tubular member;
   first and second sections at opposite ends of the central section and coaxial with and extending along the longitudinal axis of the tubular member; and
   a rod extending from the central section through the slot and providing a support for a seat clamp.

13. The adjustable saddle support of claim 12, further comprising first and second bushings having respective bores therethrough, the first section of the adjustment mechanism extending through the bore of the first bushing and the second section extending through the bore of the second bushing such that the single piece member is supported by the first and second bushings within the tubular member.

14. The adjustable saddle support of claim 12, further comprising a plunger bore extending into the central section and the rod, and a cable bore extending through the first section, the central section and the second section.

15. The adjustable saddle support of claim 14, further comprising a plunger having a transverse bore, the plunger received in the plunger bore and being biased out of the plunger bore towards an inner wall of the tubular member, the second end of the cable extending through the cable bore in the first section and the central section, the transverse bore of the plunger and secured to the second section, wherein when the lever is actuated the cable pulls the plunger into the plunger bore.

16. The adjustable saddle support of claim 15, further comprising a threaded bore in the second section extending from an outer surface of the second section to the cable bore in the second section, wherein the threaded bore receives a screw to secure the second end of the cable to the single piece member.

17. An adjustable saddle support of the type providing fore and aft adjustments for adjustably connecting a saddle with a bicycle, comprising:
   a tubular member comprising a slot partially along its length;
   a single piece member comprising a central section, first and second sections at opposite sides of the central section and coaxial with the longitudinal axis of the tubular member, the central and first and second sections disposed within the tubular member, and a rod extending from the central section through the slot;
   first and second bushings having respective bores therethrough, the first section of the single piece member extending through the bore of the first bushing and the second section extending through the bore of the second bushing whereby the single piece member is supported by the bushings in the tubular member, the single piece member and the first and second bushings slidably arranged in the tubular member;
   means for securing the single piece member to the tubular member;
   a lever for actuating the adjustable saddle support;
   a cable comprising a first end and a second end, the first end of the cable connected to the lever, the second end of the cable operatively connected with the means for securing and connected to the single piece member;
   wherein when the lever is actuated the cable activates the means for securing to disengage the single piece member from the tubular member such that the single piece member and the second end of the cable can slidably move along a longitudinal axis of the tubular member.

18. The adjustable saddle support of claim 17, wherein the second end of the cable extends through one end of the tubular member.

19. A method of connecting a cable in an adjustable saddle support of the type that provides fore and aft saddle adjustments for a bicycle, the adjustable saddle support comprising a lever, a tubular member having a slot and an adjustment mechanism slidably and securably arranged therein and extending through the slot to support the saddle, the method comprising:
   connecting a first end of the cable to the lever; and
   connecting a second end of the cable to the adjustment mechanism;
   wherein when the lever is actuated the cable activates the adjustment mechanism to disengage from the tubular member such that the adjustment mechanism and the second end of the cable can slidably move along a longitudinal axis of the tubular member.

20. The method of claim 19, further comprising extending the second end of the cable through one end of the tubular member to the adjustment mechanism.

\* \* \* \* \*